United States Patent [19]

Shibaguchi et al.

[11] Patent Number: 5,031,978
[45] Date of Patent: Jul. 16, 1991

[54] RECORDING OPTICAL SYSTEM

[75] Inventors: Takashi Shibaguchi, Yokohama; Hiroyoshi Funato, Chigasaki, both of Japan

[73] Assignee: Ricoh Company, Ltd., Tokyo, Japan

[21] Appl. No.: 568,409

[22] Filed: Aug. 16, 1990

[30] Foreign Application Priority Data

Aug. 18, 1989 [JP] Japan .................................. 1-212631
Aug. 18, 1989 [JP] Japan .................................. 1-212632

[51] Int. Cl.$^5$ ............................................ G02B 26/10
[52] U.S. Cl. ........................................ 350/6.7; 350/6.1;
350/3.71; 250/566; 356/376; 382/1
[58] Field of Search .......................... 350/6.7, 6.8, 6.91,
350/6.1, 3.71; 250/566, 236; 356/376; 382/1;
369/97

[56] References Cited

U.S. PATENT DOCUMENTS 4,217,852 12/1987 Funato et al. ..................... 350/3.71
4,294,544 10/1981 Altschuler et al. ................. 356/376
4,301,374 11/1981 Hashiue .............................. 250/566

FOREIGN PATENT DOCUMENTS 113018 5/1986 Japan .
296069 12/1988 Japan .

OTHER PUBLICATIONS

Ueno, K. et al., "PLZT spatial light modulator for a 1-D hologram memory" (Applied Optics/vol. 19, No. 1/Jan. 1, 1990, pp. 164-172).

Primary Examiner—Bruce Y. Arnold
Assistant Examiner—Loha Ben
Attorney, Agent, or Firm—Cooper & Dunham

[57] ABSTRACT

A recording optical system includes a semiconductor laser for emitting a light beam and a shutter device for changing the spot size of the light beam. The shutter device has a shutter array in which a plurality of shutter elements are arranged in a line, each of the shutter elements being controlled so as to be opened and shut in accordance with a gradational image. The recording optical system also has a deflection optical system for deflecting the light beam which passes through the shutter device and an image formation optical system for focusing the light beam which is deflected by the deflection optical system on a recording medium, so that the light beam scans the recording medium to form the image.

9 Claims, 6 Drawing Sheets

RECORDING OPTICAL SYSTEM

BACKGROUND OF THE INVENTION

The present invention generally relates to a recording optical system used in a laser beam printer, a digital copy machine and so on, and more particularly to a recording optical system capable of changing the spot size of a light beam.

Conventionally, in order to carry out, high quality printing, a laser beam recording apparatus which is capable of recording a gradational image has been proposed. In this type of laser beam recording apparatus, due to changing the dot size for a pixel, the gradational image is obtained.

In Japanese Laid-Open Patent Application No. 61-113018, an aperture stop by which the dot size of the laser beam is changed and a control means for controlling the size of the aperture stop are disclosed.

In Japanese Laid-Open Patent Application No. 63-296069, an apparatus in which the intensity of a light beam emitted from a semiconductor laser element is controlled so that the dot size of the light beam is changed is disclosed. In this apparatus, when the image information of two adjacent dots corresponds to a case where the light beam is not irradiated, the dot size is enlarged so that it is possible to prevent a line image from separating.

In the apparatus disclosed in Japanese Laid-Open Patent Application No. 61-113018, the mechanical aperture stop, a liquid crystal aperture stop or the like is used as the aperture stop so that the response of the aperture stop is slow. Thus it is difficult to rapidly print.

In the apparatus disclosed in Japanese Laid-Open Patent Application No. 63-296069, the intensity of light beam emitted from the semiconductor laser is changed so that it is difficult to sufficiently change the dot size of the light beam.

SUMMARY OF THE INVENTION

Accordingly, a general object of the invention is to provide a novel and useful recording optical system in which the disadvantages of the aforementioned prior art are eliminated.

A more specific object of the present invention is to provide a recording optical system capable of easily changing the dot size of a light beam.

Another object of the present invention is to provide a recording optical system capable of rapidly recording.

The above objects can be achieved by a recording optical system comprising light source means for emitting a light beam, shutter means optically coupled to the light source means for changing a spot size of the light beam, the shutter means having a shutter array in which a plurality of shutter elements are arranged in a line, each of the shutter elements being controlled so as to be opened and to be shut in accordance with a gradational image, deflection means optically coupled to the shutter means for deflecting the light beam which passes through the shutter means, and image formation means optically coupled to the deflection means for focusing the light beam which is deflected by the deflection means on a recording medium, so that the light beam scans the recording medium to form the image.

Additional objects, features and advantages of the present invention will become apparent from the following detailed description when read in conjunction with the accompanying drawings.

BRIEF DESCRIPTION OF THE DRAWINGS

FIGS. 2A and 2B show an example of the structure of a shutter device shown in FIGS. 1A and 1B;

DESCRIPTION OF THE PREFERRED EMBODIMENTS

Figure 1A:
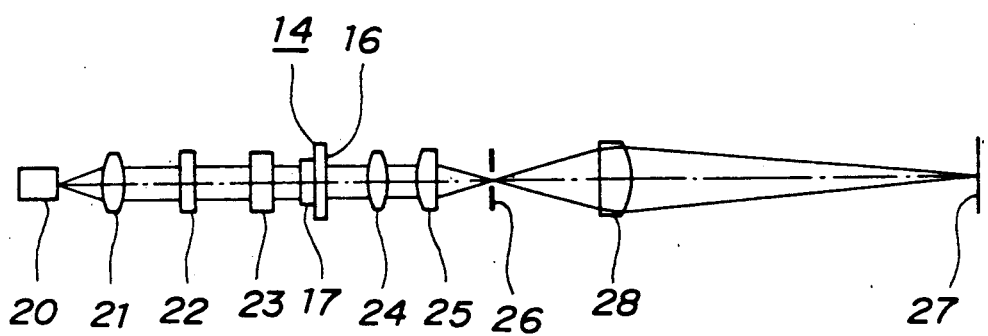
FIGS. 1A and 2B show an embodiment of a recording optical system according to the present invention.
Figure 1B:
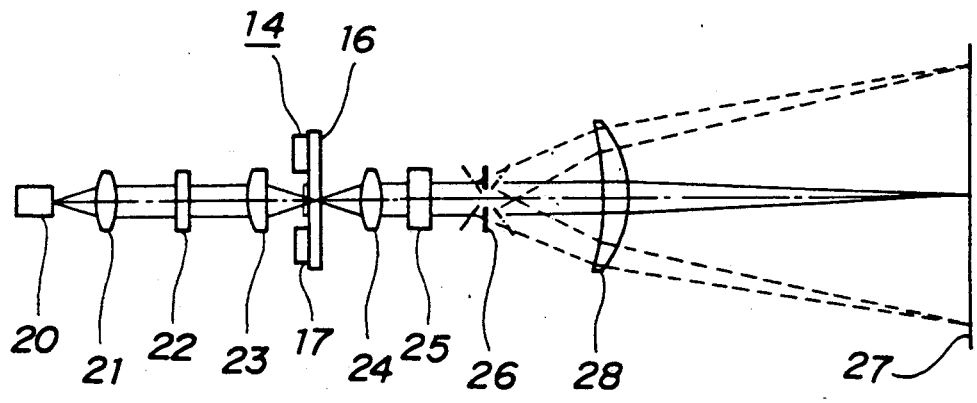

A description will now be given of a preferred embodiment with reference to FIGS. 1A through 3B. Referring to FIGS. 1A and 1B showing the structure of a recording optical system, the recording optical system has a semiconductor laser device 20 which is modulated and driven in accordance with image information and a shutter device 14. A coupling lens 21, a halfwave plate 22 and a cylindrical lens 23 are provided in an optical path formed between the semiconductor laser device 20 and the shutter device 14. That is, the light beam emitted from the semiconductor laser device 20 is projected through the coupling lens 21, halfwave plate 22 and the cylindrical lens 23 onto the shutter device 14. The light beam passing through the coupling lens 21 becomes a light beam having parallel rays. When the light beam passes through the halfwave plate 22, the polarization of the light beam becomes 45° to the sub scanning direction. The light beam passing through the cylindrical lens 23 is focused on the shutter device 14. The shutter device 14 has a shutter array in which a plurality of shutter elements are arranged in a line, as will be described later. A lens 24, a cylindrical lens 25, a polygonal mirror 26 and a toroidal f - $\theta$ lens 28 are respectively provided in an optical path formed between the shutter device 14 and a scanning medium 27 such as a photosensitive member. That is, the light beam passing through the shutter device 14 is projected through the lens 24, the cylindrical lens 25, the polygonal mirror 26 and the toroidal f -$\theta$ lens 28 onto the surface of the scanning medium 27. When the polygonal mirror 26 is rotated, the light beam incident to the polygonal mirror 26 is deflected in the main scanning direction. The light beam deflected by the polygonal mirror 26 is focused on the surface of the scanning medium 27 by the toroidal f -$\theta$ lens 28. Thus the light beam scans the scanning medium 27 in synchronism with the rotation of the polygonal mirror 26. The shutter device 14 and the scanning medium 27 are respectively positioned so as to be in a conjugate relationship with each other. That is, an image of the surface of the shutter device 14 is formed on the surface of the scanning medium 27, and thus, the light beam passing through opened shutter elements of the shutter device 14 is exactly focused on the surface of the scanning medium 27 so that the dot size in the sub scanning direction is changed.

Figure 2A:
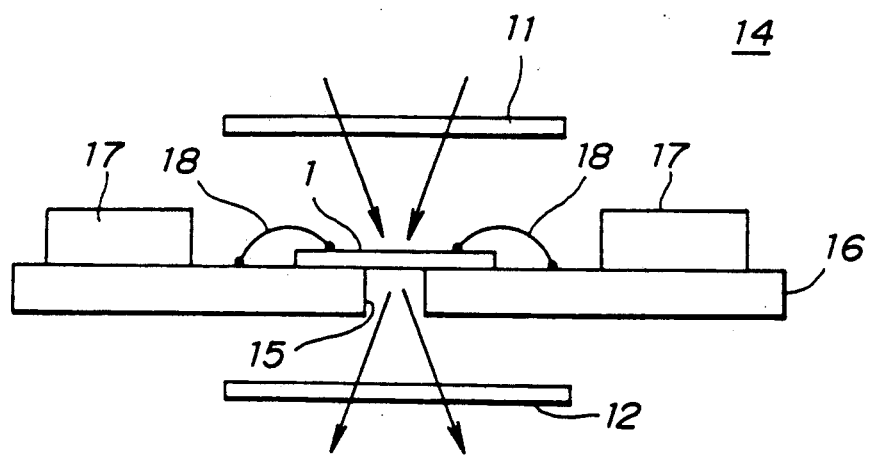
Figure 2B:
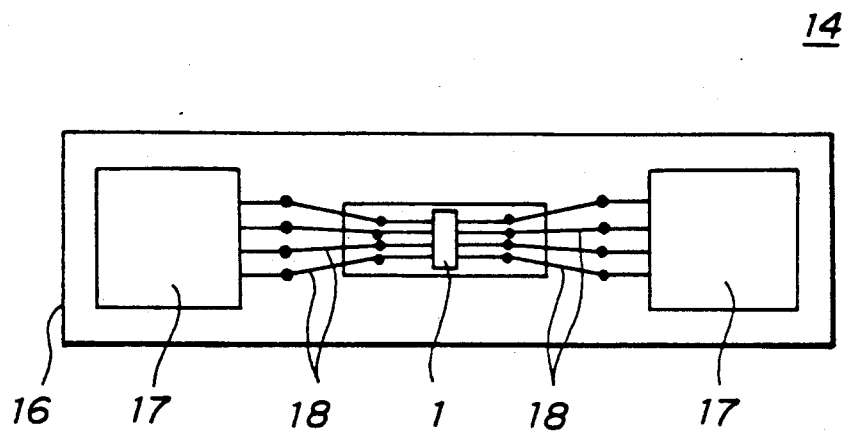

The structure of the shutter device 14 is, for example, shown in FIGS. 2A and 2B. Referring to FIGS. 2A and 2B, the shutter device 14 has a ceramic substrate 16, a shutter array 1, driving ICs 17, a polarizer 11 and an analyzer 12. An opening 15 is formed at a center portion of the ceramic substrate 16. The shutter array 1 is adhered to the center portion of the ceramic substrate 16 so that shutter elements of the shutter array 1 face the opening 15. The driving ICs 17 are respectively fixed, at both sides of the shutter array 1, on the ceramic substrate 16. Each of the electrodes of each of the shutter elements is electrically connected to a corresponding one of the terminals of the driving ICs 17 by a respective wire 18. An end of each of the wires 18 is bonded on a bonding pad which is formed on the ceramic substrate 16 and is connected to a corresponding one of the terminals of the driving ICs 17. Another end of each of the wires 18 is bonded on a bonding pad which is formed on the shutter array 1 and is connected to a corresponding one of the electrodes of each of the shutter elements. The polarizer 11 is provided over the shutter array 1 so that the light beam passing through the polarizer 11 is incident to the shutter array 1. The analyzer 12 is provided under the shutter array 1 so that the light beam passing through the shutter array 1 and the opening 15 of the ceramic substrate 16 is incident to the analyzer 12. The polarizer 11 and the analyzer 12 are arranged so as to be mutually crossed nicols, and then, the polarizer 11 and the analyzer 12 are respectively fixed to a housing ( not shown in FIGS. 2A and 2B ) of the shutter device 14.

The shutter array 1 and the driving ICs 17 are integrated on the ceramic substrate 16 so that the stray capacity in the shutter device 14 becomes small, and thus it is then possible to quickly drive the shutter array.

Figure 3A:
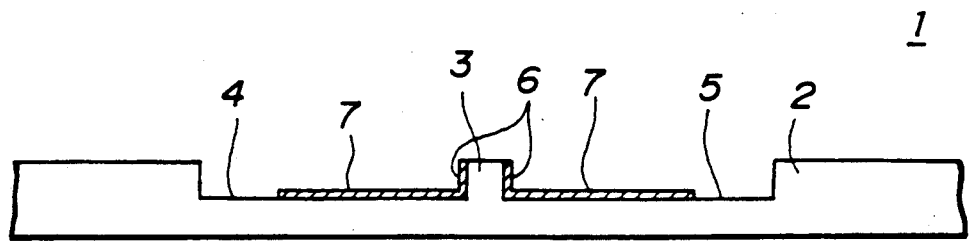
FIG. 3A and 3B show an example of the structure of a shutter array shown in FIGS. 2A and 2B.
Figure 3B:
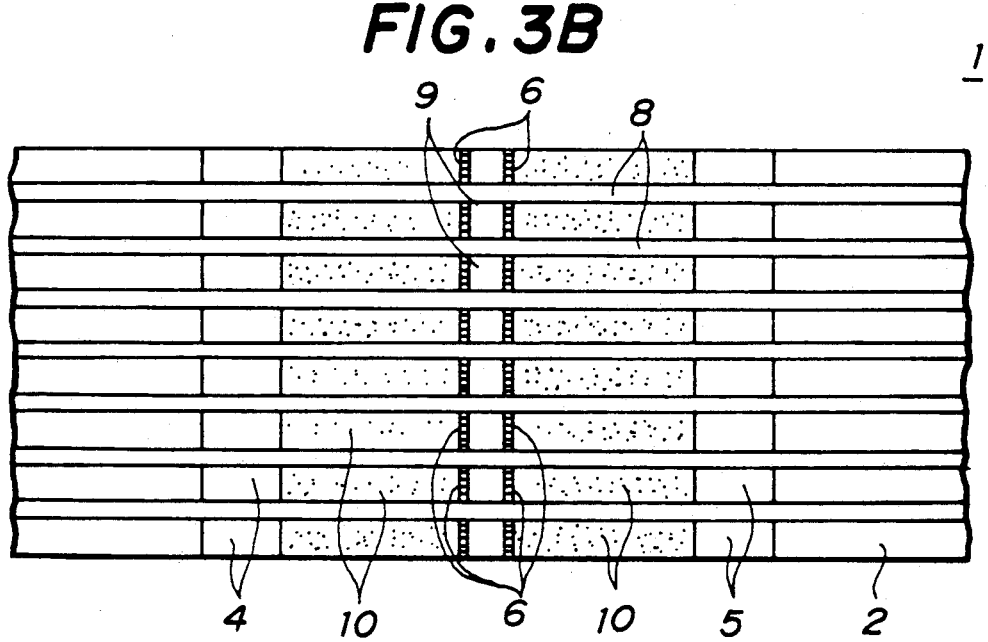

The structure of the shutter array 1 is, for example, shown in FIGS. 3A and 3B.

Referring to FIGS. 3A and 3B, the shutter array 1 made of an electrooptic crystal plate 2 which is, for example, made of PLZT. Both surfaces of the electrooptic crystal plate 2 are respectively optically polished. The thickness of the electrooptic crystal plate 2 is, for example, 400 μm. Grooves 4 and 5 are formed on a surface of the electrooptic crystal plate 2 by use of a dicing saw so that a respective light transmission portion 3 projects from a bottom surface of each of grooves 4 and 5. The width of each of the light transmission portions 3 is, for example, 100 μm. The depth of each of the grooves 4 and 5 is, for example, about 200 μm. The width of each of the grooves 4 and 5 is equal to or greater than 1 mm. It is possible to cut the whole surface of the electrooptic crystal plate 2 except for each of the light transmission portions 3. In this case also, each of the light transmission portion 3 projects from a cutting surface of the electrooptic crystal plate 2. At either event, each of the light transmission portions 3 has a convex shape so that side walls 6 are formed o each of the light transmission portions 3.

Electrode films 7 are formed on a surface of the electrooptic crystal plate 2 so as to cover a predetermined area of each of the grooves 4 and 5 and each of the side walls 6 of each of the light transmission portions 3. A plurality of grooves 8 are formed on the electrooptic crystal plate 2 on which the electrode films 7 are formed in a direction perpendicular to each of the grooves 4 and 5. The depth of each of the grooves 8 is, for example, 250 μm, and the width thereof is, for example, 20 μm. A distance between adjacent two grooves 8 is, for example, 100 μm. Thus, each of the light transmission portions 3 and the electrode films 7 are respectively divided into elements ( 8 elements in this case ) as shown in FIG. 3A. That is, a plurality of shutter elements 9 into which each of the light transmission portions 3 is divided by the grooves B are arranged in a line on the electrooptic crystal plate 2. Each of the shutter elements 9 has a pair of electrodes 10 into which the electrode films 7 are divided by the grooves 8.

The electrode films 7 are formed by spattering on the bottom surfaces of the grooves 4 and 5, which are rough, so that the electrode films 7 are not flaked off when the grooves 8 are formed.

A description will now be given of the function principle of the shutter array 1 with reference to FIG. 4.

Figure 4:
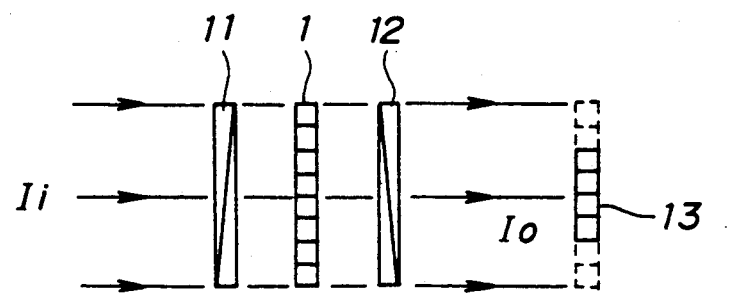
FIG. 4 shows the function principle of the shutter array.

Basically, the polarizer 11 is provided close to a side of the shutter array 1 to which the light beam is incident, and the analyzer 12 is provided close to the other side of the shutter array 1 from which the light beam is emitted, as shown in FIG. 4. The polarizer 11 and the analyzer 12 are arranged so as to be mutually crossed nicols and to be inclined at 45° to the direction of an electric field generated in the shutter array 1. In the case where the intensity of the incident light beam is Ii and the intensity of the output light beam passed through the analyzer 12 is Io, the following formula stands for one shutter element 9:

$$Io = Ii \sin^2 \Gamma/2 \ldots \quad (1)$$

In formula (1), Γ represents a phase difference.
The phase difference Γ is calculated by the following formula :

$$\Gamma = (\pi/\lambda) \cdot t \cdot n_0^3 \cdot Rc \cdot E^2 \ldots \quad (2)$$

λ : wave length
t : thickness of the shutter array
$n_o$ : refractive index
E : intensity of the electric field
Rc : second electrooptic constant According to the formula (1), when the phase difference Γ is mπ ( m is an odd integer ), the intensity Io of the output light beam is maximum. That is, the shutter element 9 changes to an ON state when the shutter element 9 is opened. On the other hand, when the phase difference Γ is m' π ( m' is an even integer ), the intensity Io of the output light beam is minimum. That is, the shutter element 9 changes to an OFF state when the shutter element 9 is shut.

Thus, the voltage applied across each of the pairs of electrodes 10 of each of the shutter elements 9 is independently controlled so that the opening and closing of each of the shutter elements 9 is independently controlled, and it is therefore possible then to control the number of opened shutter elements 9. That is, it is possible to change the spot size of the light beam passing through the shutter array 1. FIG. 4 shows the intensity distribution 13 of the light beam passing through the shutter array 1 and the analyzer 12 in the case where four shutter elements 9 positioned at a center portion of the shutter array 1 are opened and the remaining four shutter elements 9 are shut. According to the shutter array 1 described above, it is possible to change the dot size for one pixel.

Figure 5:
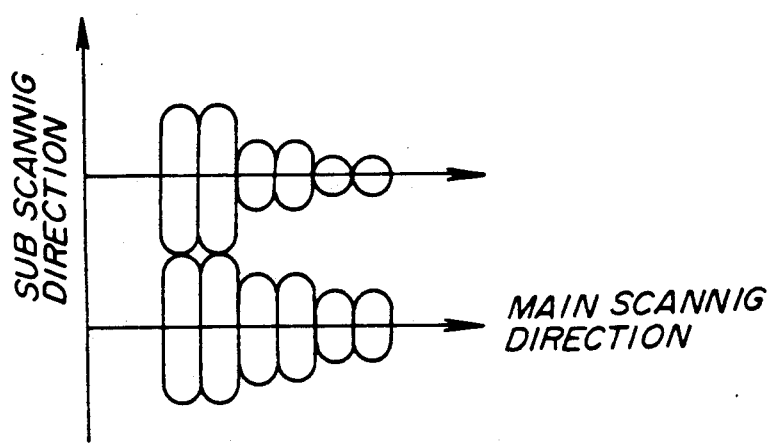
FIG. 5 and FIG. 6 show the state where the size of each of the dots is changed.

FIG. 5 shows the state where the size of each of the dots is changed. The image information has a dot information which represents whether the dot is printed or not and gradational information. The semiconductor laser 20 is driven in accordance with the dot information, and then the shutter device 14 is controlled in accordance with the gradational information. In the shutter device 14, the number of the shutter elements 9 which are opened is changed in accordance with the gradational information so that the dot size in the sub scanning direction for a pixel is changed as shown in FIG. 5. Thus it is possible to record the gradational image.

Figure 6:
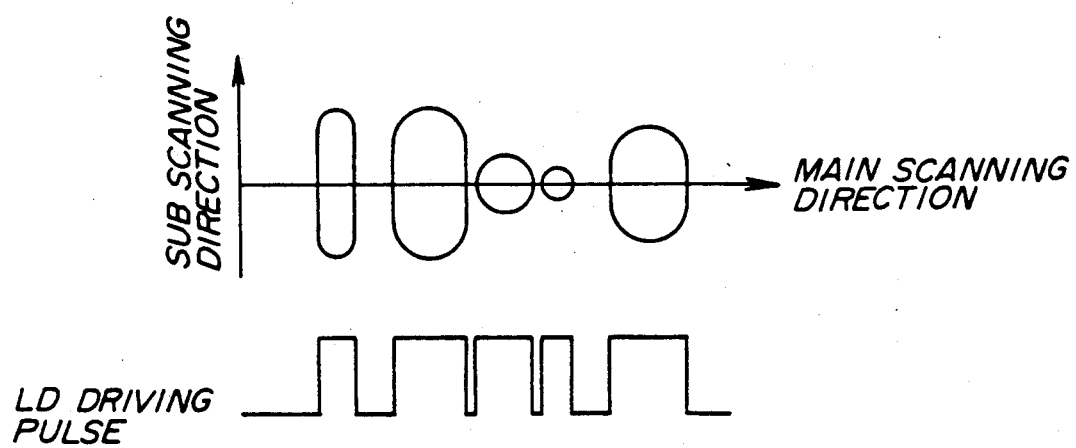

It is possible to change the width of the driving pulse for the semiconductor laser 20. In the case where the width of the driving pulse of the semiconductor 20 is controlled (a pulse width modulation), the dot size in the main scanning direction for a pixel is changed as shown in FIG. 6.

When the dot size is changed in both the sub scanning and the main scanning directions due to the controlling of the shutter device 14 and the semiconductor laser 20, it is possible to record the improved gradational image.

In addition, it is possible to control the intensity of the light beam emitted from the semiconductor laser 20 in accordance with the gradational information (a light intensity modulation). When the light intensity modulation is further performed, it is possible to record the more improved gradational image.

A description will now be given of other examples of the shutter array with reference to FIGS. 7A through 9B.

Figure 7A:
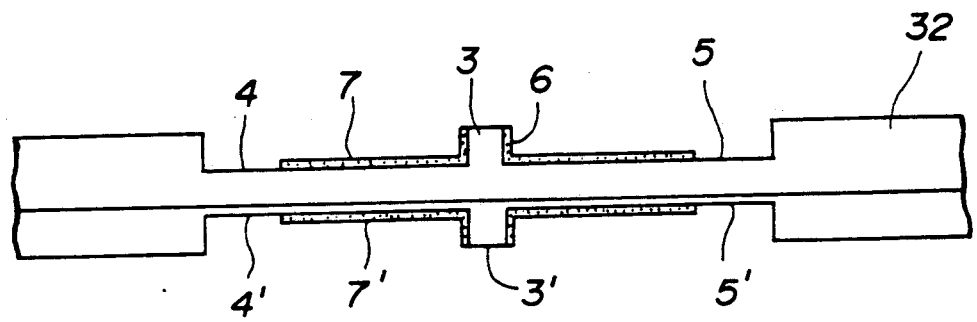
FIGS. 7A through 9B show other examples of the structure of the shutter array shown in FIGS. 2A and 2B.
Figure 7B:
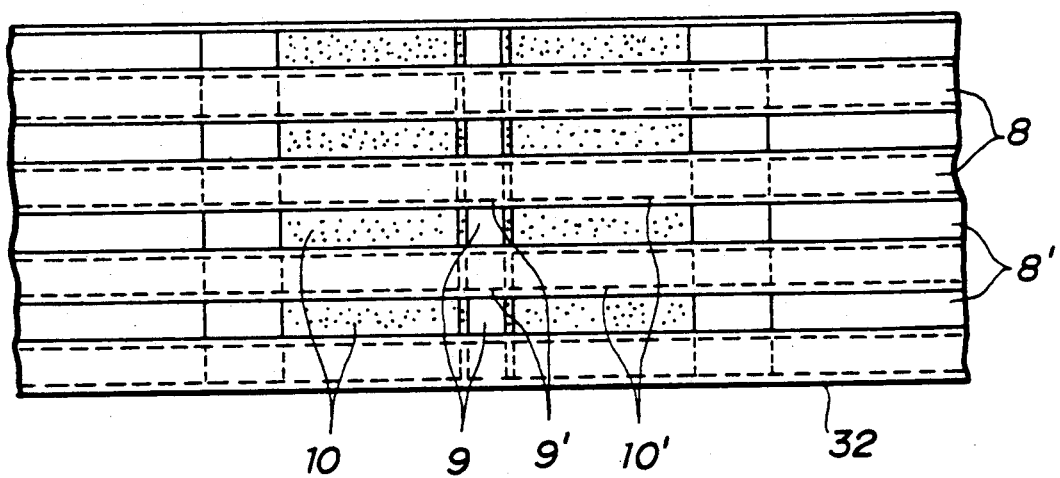

Referring to FIGS. 7A and 7B, a shutter array 31 has an electrooptic crystal plate 32 which is, for example, made of PLZT. Both surfaces of the electrooptic crystal plate 32 are optically polished. The thickness of the electrooptic crystal plate 32 is, for example, 600 μm. The light transmission portions 3 and 3', the grooves 4, 4', 5, 5', and 8, 8' and the electrode films 7 and 7'are respectively formed on both surfaces of the electrooptic crystal plate 32. That is, the shutter elements 9 and 9' and the electrodes 10 and 10' are respectively formed on both surfaces of the electrooptic crystal plate 32 so as to be arranged on alternating surfaces of the electrooptic crystal plate 32. Thus, none of the respective shutter elements 9 formed on a surface of the electrooptic crystal plate 32 overlap the respective shutter elements 9' formed on another surface thereof.

According to the shutter array 31 as shown in FIGS. 7A and 7B, the adjacent shutter elements 9 and 9' are closer, in comparison with the shutter array in which the shutter elements are formed on only one surface of the electrooptic crystal plate, as shown in FIGS. 3A and 3B, in the sub scanning direction so that the amount of loss which is shut off by the shutter array decreases in comparison with the above shutter array. Thus, the density of the shutter elements increases.

Figure 8A:
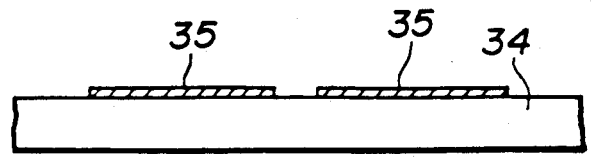
Figure 8B:
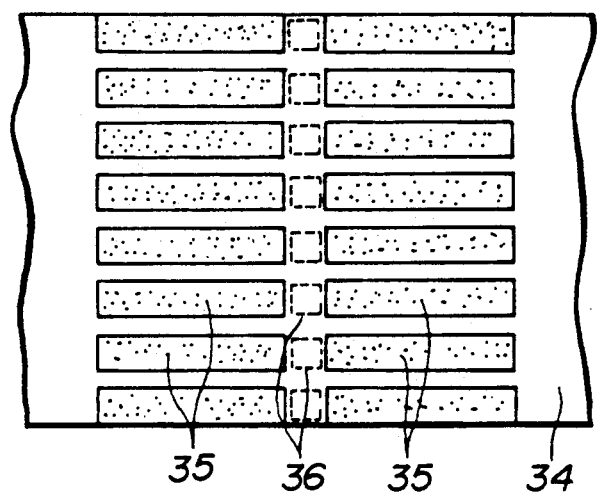

Referring to FIGS. 8A and 8B, a shutter array 33 has an electrooptic crystal plate 34 which the electrooptic crystal plate 34 are optically polished. An electrode film is directly formed on a surface of the electrooptic crystal plate 34 by spattering. The electrode film is separated into a plurality of electrodes 35 by etching. Each of shutter elements 36 is formed between a respective pair of electrodes 35. In this case, the area of each of the electrodes 35 is small such as about 50 μm × 200 μm, so that the capacity between each pair of the electrodes 35 is small.

Figure 9A:
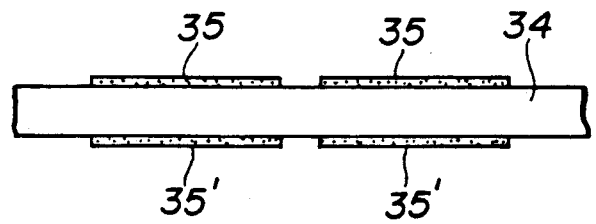
Figure 9B:
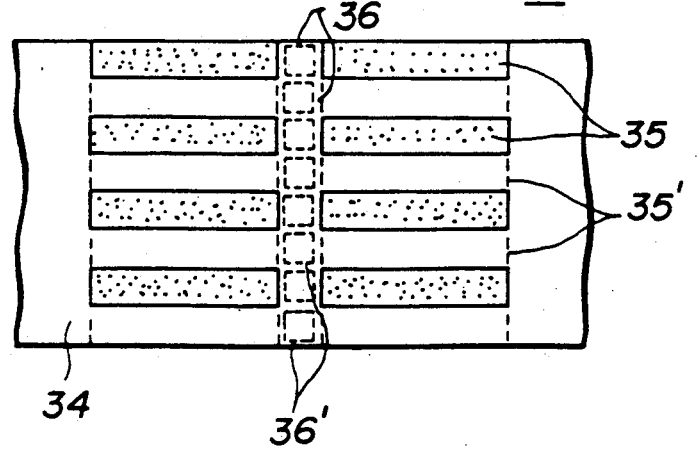

Referring to FIGS. 9A and 9B, the electrodes 35 and 35' are formed on both surfaces of the electrooptic crystal plate 34 so as to be arranged on alternating surfaces of the electrooptic crystal plate 34 in the same manner a the shutter array shown in FIGS. 7A and 7B. Thus, none of the respective shutter elements 36 formed between each pair of the electrodes on a surface of the electrooptic crystal plate 34 overlap the respective shutter elements 36' formed on another surface thereof. The distance between the adjacent shutter elements 36 and 36' in the sub scanning direction is, for example, 50 μm.

According to the present invention, the recording optical system has a shutter device having a plurality of shutter elements so that it is possible to change the dot size due to changing the number of shutter elements which are opened. Thus, it is possible to easily and rapidly change the dot size of the light beam. In addition, it is possible to greatly change the dot size of the light beam so that an improved gradational image is formed on the recording medium.

The present invention is not limited to the aforementioned embodiments, and variations and modifications may be made without departing from the scope of the claimed invention.

What is claimed is:

1. A recording optical system comprising :
   light source means for emitting a light beam ;
   shutter means optically coupled to said light source means, for changing a spot size of the light beam, said shutter means having a shutter array in which a plurality of shutter elements are arranged in a line, each of said shutter elements being controlled so as to be opened and shut in accordance with a gradational image;
   deflection means optically coupled to said shutter means, for deflecting the light beam which passes through said shutter means; and
   image formation means optically coupled to said deflection means, for focusing the light beam which is deflected by said deflection means on a recording medium,
   so that the light beam scans said recording medium to form the image.

2. A recording optical system as claimed in claim 1, wherein said deflection means has a polygonal mirror which is rotated.

3. A recording optical system as claimed in claim 1, wherein said shutter array has an electrooptic crystal plate, and said shutter means further has a polarizer and a analyzer, said electrooptic crystal plate being positioned between said polarizer and said analyzer, and said polarizer and said analyzer being arranged so as to be mutually crossed nicols.

4. A recording optical system as claimed in claim 3, wherein said electrooptic crystal plate is made of PLZT.

5. A recording optical system as claimed in claim 3, wherein said electrooptic crystal plate has a plurality of light transmission portions as shutter elements, said shutter array has a plurality of electrodes, and each of said light transmission portions is positioned between each respective pair of said electrodes.

6. A recording optical system as claimed in claim 5, wherein each of said light transmission portions projects from a surface of said electrooptic crystal plate.

7. A recording optical system as claimed in claim 6, wherein each of said electrodes has a part which is formed on a wall of a corresponding one of said light transmission portions projecting from the surface of said electrooptic crystal plate.

8. A recording optical system as claimed in claim 5, wherein each of said light transmission portions is formed on an alternating surface of said electrooptic crystal plate.

9. A recording optical system as claimed in claim 5, wherein said electrooptic crystal plate and a driving means for driving each of said light transmission portions as shutter elements are integrated on a base, each of said electrodes being electrically coupled to said driving means.

* * * * *